United States Patent [19]
Kashiwada et al.

[11] Patent Number: 4,893,669
[45] Date of Patent: Jan. 16, 1990

[54] SYNTHETIC RESIN HEAT EXCHANGER UNIT USED FOR COOLING TOWER AND COOLING TOWER UTILIZING HEAT EXCHANGER CONSISTING OF SUCH HEAT EXCHANGER UNIT

[75] Inventors: Ken Kashiwada, Fujisawa; Tadanobu Muto, Tokyo; Tetsuo Sasaki, Fujisawa, all of Japan

[73] Assignee: Shinwa Sangyo Co., Ltd., Tokyo, Japan

[21] Appl. No.: 286,291

[22] Filed: Dec. 19, 1988

[30] Foreign Application Priority Data

Feb. 5, 1988 [JP] Japan ................................. 62-25388
Mar. 17, 1988 [JP] Japan ................................. 62-64536

[51] Int. Cl.⁴ ...................... G05D 15/00; F28F 3/00; F28F 21/06
[52] U.S. Cl. ........................................ 165/38; 165/46; 165/103; 165/166; 165/170; 165/900; 165/905; 165/115; 261/153
[58] Field of Search ...................... 165/32, 38, 46, 103, 165/115, 166, 170, 900, 905; 261/153

[56] References Cited

U.S. PATENT DOCUMENTS

| | | | |
|---|---|---|---|
| 3,808,104 | 4/1974 | Davidson | 165/166 |
| 4,119,140 | 10/1978 | Cates | 165/900 |
| 4,156,419 | 5/1979 | Lewis, Sr. | 165/170 |
| 4,182,411 | 1/1980 | Sumitomo et al. | 165/166 |
| 4,263,967 | 4/1981 | McNab et al. | 165/166 |
| 4,287,883 | 9/1981 | Kyrias | 165/170 |
| 4,452,300 | 6/1984 | Zeilon | 165/166 |
| 4,623,494 | 11/1986 | Gautier et al. | 165/900 |
| 4,693,302 | 9/1987 | Dodds | 165/900 |

FOREIGN PATENT DOCUMENTS

2008738 6/1979 United Kingdom ................ 165/900

*Primary Examiner*—John Ford
*Attorney, Agent, or Firm*—Oblon, Spivak, McClelland, Maier & Neustadt

[57] ABSTRACT

The invention provides flat, thin and hollow heat exchanger units of synthetic resin make, each operating to have a cooling water fed thereto and air flowed horizontally in an air passage therebetween, thus realizing an indirect contact heat exchange between the air and the cooling water through both wall plates. The invention further relates to a crossflow cooling tower incorporating a wet heat exchanger or packing material and an indirect contact type heat exchanger operating on the afore-mentioned heat exchanger units.

20 Claims, 8 Drawing Sheets

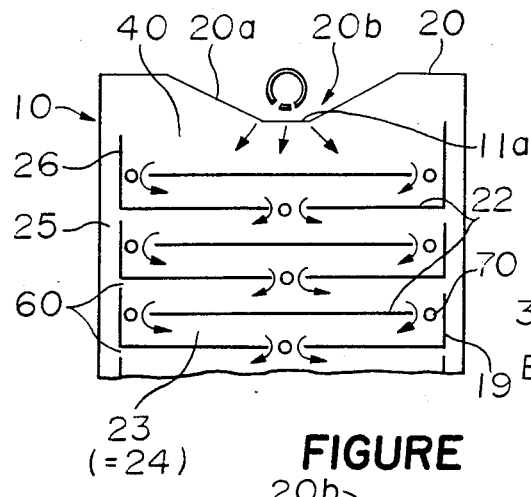
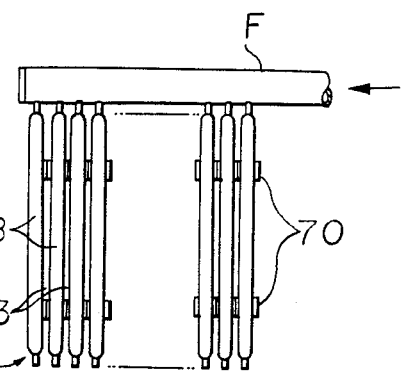
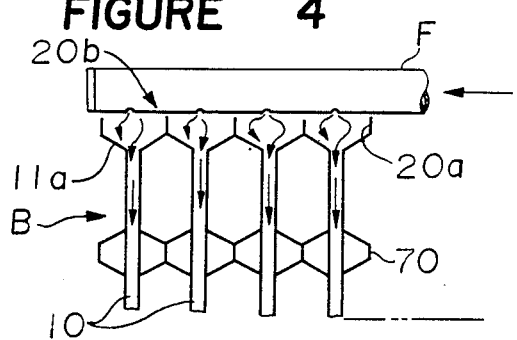
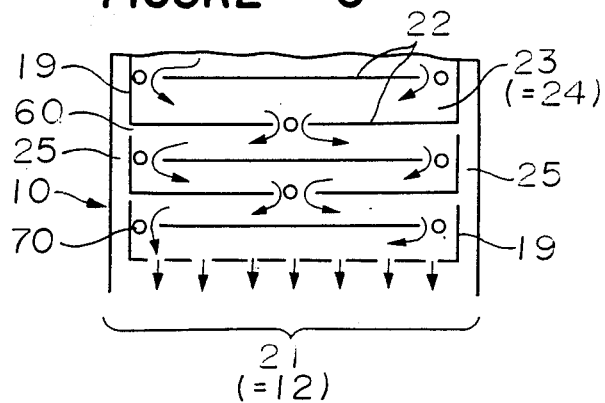

SYNTHETIC RESIN HEAT EXCHANGER UNIT USED FOR COOLING TOWER AND COOLING TOWER UTILIZING HEAT EXCHANGER CONSISTING OF SUCH HEAT EXCHANGER UNIT

BACKGROUND OF THE INVENTION

1. Field of the Invention

This invention relates to a heat exchanger unit used for a cooling tower and a cooling tower utilizing a heat exchanger consisting of such heat exchanger unit.

2. Discussion of Background

Such kind of indirect contact type heat exchanger has already been disclosed in Japanese Unexamined Patent Publication No. 100370/1976, referring to a heat exchanger used for a cooling tower which is constructed entirely of synthetic resin and provided with a plurality of liquid flowing passages flat, vertical and parallel with each other, and air flowing passages flat to have a vertical plane each which are formed between the liquid flowing passages, the two passages being divided by a heat exchanging partition plate consisting of a plurality of synthetic resin plates which brings both the fluids into indirect contact with each other, and both walls of each air flowing passage are formed on an inverse U-shaped member, corrugated side walls of the adjacent inverse U-shaped members are bonded together by a rib portion provided protrusively and coupled together at the side edges by a coupling panel, thus forming the aforementioned liquid flowing passages.

As shown in FIG. 17, the heat exchanger described in the aforementioned invention is suspended in several and so supported in story inside of a packing material facing on an outer air inlet port of the cooling tower, thus intending for prevention of a whitish smoke or mist in wintertime.

In such prior art one, however, dust and microbe are capable of sticking on a wall surface of the liquid flowing passage which is narrowed and bent during a long period of service to thereby reduce the liquid falling speed, thus a sectional area of the passage is substantially narrowed, the liquid is hence prevented from falling at a predetermined rate of flow, overflows on a feed side of the heat exchangers, and thus not only the air ambience is wet unnecessarily, but also a loss may result on refrigerant.

In case the heat exchanger is suspended in several and so supported in story inside of a packing material facing on an outer air inlet port of the cooling tower (FIG. 17), whitish smoke or mist cannot always be prevented due to an overflow phenomenon o the aforementioned feed side, and further since the liquid flowing passage is narrow, the air having come thereinto is hard to extract, and thus is kept staying in the passage to hinder heat exchange.

SUMMARY OF THE INVENTION

An object of the invention is to provide a heat exchanger unit wherein if a loading is caused partly in a liquid flowing passage at a main part for carrying out heat exchange of an indirect contact type heat exchanger, a liquid feed/discharge rate can be retained constant for the heat exchanger as a whole, thus no influence will be exerted on a flow rate of the liquid flowing passage, and the air having come thereinto can be extracted smoothly, and also to provide the cooling tower using such heat exchanger unit.

To attain the aforementioned object, a synthetic resin heat exchanger unit for use on cooling tower of the particular invention is a flat and thin hollow body, wherein the interior functions as a liquid flowing passage, a cooling water feed part open externally is formed on an upper portion of the hollow body, a discharge part open eternally is also provided on a lower end of the liquid flowing passage which is a lower edge of the hollow body, a major breadth portion of the liquid flowing passage is intended for a liquid falling speed reducing part, the liquid falling speed reducing part has horizontally extending deflectors distributed overall in story covering a plural stage, the deflectors are dislocated every other to form a zigzag passage therebetween, the liquid falling speed reducing part is disposed to abut on a vertically extending overflowed-liquid escaping conduit through one vertical sealing part at least, an upper end of the vertical sealing part is shaped like a dam, the overflowed-liquid escaping conduit and a reservoir portion on the uppermost stage in the liquid falling speed reducing part communicate with each other through the dam, an air vent crossing over the vertical sealing part and opening into the overflowed-liquid escaping conduit is formed at a bent position of the zigzag liquid falling speed reducing part, a raise is formed as a spacer on outer surfaces of both the wall plates.

Further, in a crossflow cooling tower incorporating therein an indirect heat exchanger which comprises arraying adjacently a plurality of synthetic resin heat exchanger units, a flat and thin hollow body each, wherein the interior functions as a liquid flowing passage, a cooling water feed part open externally is formed on an upper portion of the hollow body, a discharge part open externally is also provided on a lower end of the liquid flowing passage which is a lower edge of the hollow body, a major breadth portion of the liquid flowing passage is intended for a liquid falling speed reducing part, the liquid falling speed reducing part has horizontally extending deflectors distributed on the overall hollow body in story covering a plural stage, a zigzag passage is formed between the deflectors, using a raise formed on both front and back of these heat exchanger units as a spacer, forming a horizontal air flowing passage between the adjacent heat exchanger units, said crossflow cooling tower being characterized in that an air vent crossing over the vertical sealing part and opening into the overflowed-liquid escaping conduit is formed at a bent position of the zigzag liquid falling speed reducing part, an upper edge of the hollow body is opened overall in breadth to overhang both wall plates of the upper edge outwardly, a central portion of the upper edge is formed into a U-shaped recession, the cooling water feed part is formed on a bottom of the recession, and when the heat exchanger units are arrayed adjacently in sequence the cooling water feed parts come close each other to form a temporary cooling water reservoir along an upper edge of the indirect heat exchanger.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a side view showing the stage wherein the heat exchanger units of FIG. 1 are arrayed in parallel;

FIG. 3 is a fragmentary front view showing a mode of another feed part;

FIG. 4 is a plan view showing the state wherein the heat exchanger units of FIG. 3 are arrayed in parallel;

FIG. 5 is a fragmentary front view representing another example of a lower portion of the heat exchanger unit;

DETAILED DESCRIPTION OF PREFERRED EMBODIMENT

A typical example of the heat exchanger unit according to the invention will then be described.

Figure 1:
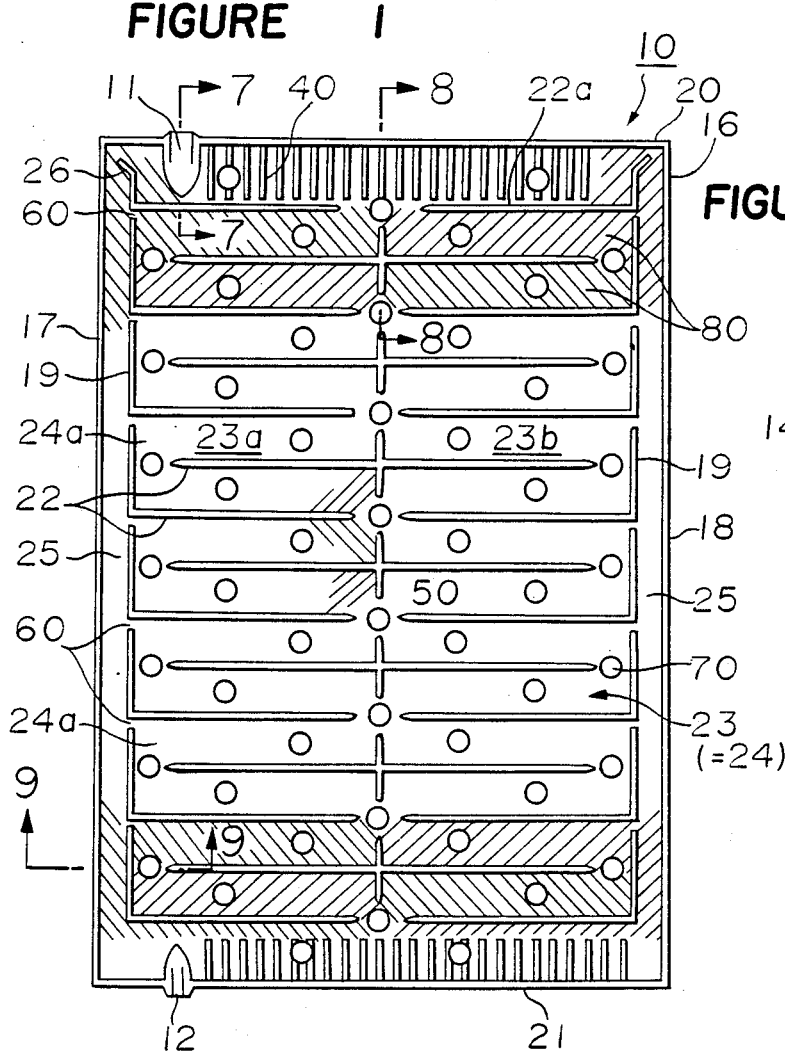
FIG. 1 is a front view of a heat exchanger unit given in one embodiment of the invention.
Figure 8:
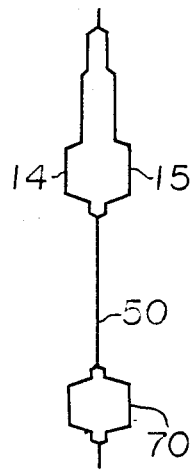
FIG. 7, FIG. 8 and FIG. 9 are sectional views taken on lines 7—7, 8—8, 9—9 of FIG. 1 respectively.
Figure 9:
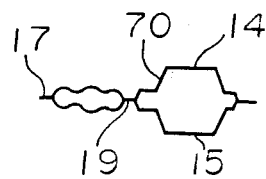
Figure 7:
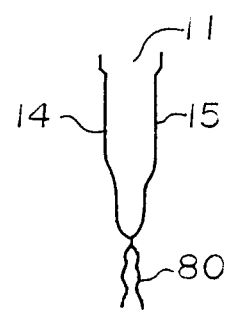

In FIG. 1, a reference numeral 10 denotes a heat exchanger unit, the heat exchanger unit 10 comprises preferably a synthetic resin flat hollow body obtained through vacuum molding or blow molding, the interior functions as a liquid flowing passage, and while not particularly limited, the synthetic resin may preferably be a cheap and formable material such as polyvinyl chloride, polyethylene, polypropylene or the like.

A cylindrical supplying port 11 which is a cooling water feed part open externally is provided on an upper edge corner of the hollow body 10, and also a discharge port 12 which is a cooling water discharge part open externally is provided on the lower edge corner. The supplying port 11 and the discharge port 12 are positioned on the same side, or left side as illustrated, however, the position is not necessarily so limited.

A peripheral sealing part 16 with a pair of wall plates 14, 15 deposited thereon is formed in the periphery of the hollow body 10 or the heat exchanger unit, and both the wall plates 14, 15 form vertical sealing parts 19 deposited mutually along side edges 17, 18 of the heat exchanger unit 10 at positions in parallel with the side edges 17, 18 and coming somewhat inward from both the side edges 17, 18, and upper and lower ends of the left and right two vertical sealing parts 19 do not reach upper and lower end edges 20, 21 of the heat exchanger unit 10, respectively.

Horizontally extending deflectors 22 with both the wall plates 14 and 15 deposited mutually therefor are distributed in story covering a plural stage at central portions of the two vertical sealing parts 19, these deflectors 22 are displaced every other, a liquid falling speed reducing part 24 covering a major portion of the breadth of the liquid flowing passage is formed between these deflectors 22 as a zigzag passage 23, and both the wall plates 14, 15 in the liquid falling speed reducing part 24 function as a main heat exchange surface of the heat exchanger unit 10.

Figure 10:
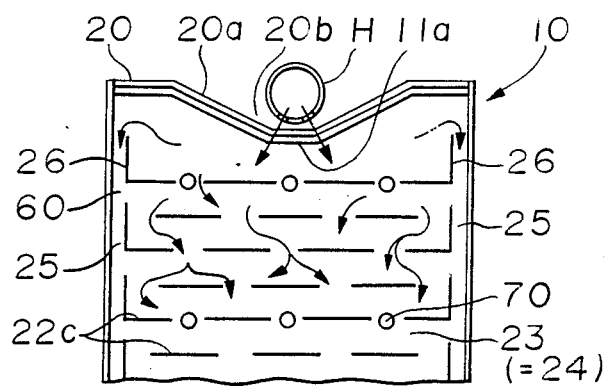
FIG. 10 is a fragmentary front view showing a shape of another deflector of the heat exchanger unit.

A shape of the deflector 22 is not necessarily limited thereto, and there may be a case where the liquid falling speed reducing part 24 is formed by distributing a multiplicity of horizontally-short and discontinuous projections 22C and dislocating the projections 22C vertically in order (FIG. 10).

On the other hand, narrow and vertical spaces between each vertical sealing part 19 and the side edges 17, 18 function as an overflowed-liquid escaping conduit 25, an upper end 26 of the vertical sealing part 19 is shaped like a dam, an uppermost one 22a of the deflectors 22 is formed to come somewhat lower than the upper end 26, and the uppermost deflector 22a, the upper end edge 20 of the hollow body and both the wall plates 14, 15 form a liquid reservoir 40. The liquid reservoir 40 and the overflowed-liquid escaping conduit 25 communicate with each other through the dam 26.

Barring the liquid reservoir 40, the liquid falling speed reducing part 24 is divided into two sequences of liquid flowing passages 23a, 23b, as illustrated, by a vertical and discontinuous partition sealing portion 50 at the central portion. However, liquid flowing passages in four sequences or more may be formed, as desired, by increasing the number of sealing portions 50.

An air vent 60 crossing over the vertical sealing part 19 and opening into the overflowed-liquid escaping conduit 25 is formed at a position of each bent passage 24a of the zigzag liquid falling speed reducing part 24, namely an upper corner of each bent passage 24a, and a raise 70 is formed on outer surfaces of both the wall plates 14, 15 as a spacer.

Further, both walls of the zigzag passage 23 between vertically-adjacent and horizontally-extending reflectors 22 in the synthetic resin heat exchanger unit 10 for use on cooling tower are corrugated with parallel ridges 80 inclined gradually at 45 degrees or so toward the downstream side formed on almost overall surfaces of both the walls.

The overflowed-liquid escaping conduit 25 may be provided on one side edge 17 or 18 only, and, as shown in FIGS. 3 and 4; the upper end edge 20 of the hollow body 10 is opened in full width and both wall plates 14, 15 are overhung externally at an even height with the raise 70, a U-shaped recession 20a is formed at central portion of the upper end edge 20, a supplying port 11a is formed on a bottom of the recession 20a, the upper end edges 20 of the heat exchanger units 10 adjacent at the time of assembly come in contact close with each other on the outer peripheral surfaces, and the longitudinally-extending liquid reservoir 20b may be formed of the group of recessions 20a. Further, the lower end edge 21 of the hollow body may be opened in full width, thereby substituting for the discharge port 12 in function.

Then, a sectional area of the overflowed-liquid escaping conduit may not necessarily be uniform in size but large on an upper portion of the heat exchanger and small on a lower portion.

A function of the heat exchanger unit 10 constructed as above will be described along with a function of a crossflow cooling tower A of the associated invention.

First, a plurality of heat exchanger units 10 are disposed in parallel by means of a case or other proper support frame (not indicated), and a narrow horizontal air flowing passage 33 is formed between the adjacent heat exchanger units 10 with the raise 70 as a spacer, thereby assembling an indirect contact type heat exchanger B of desired dimensions (FIG. 2).

Figure 6:
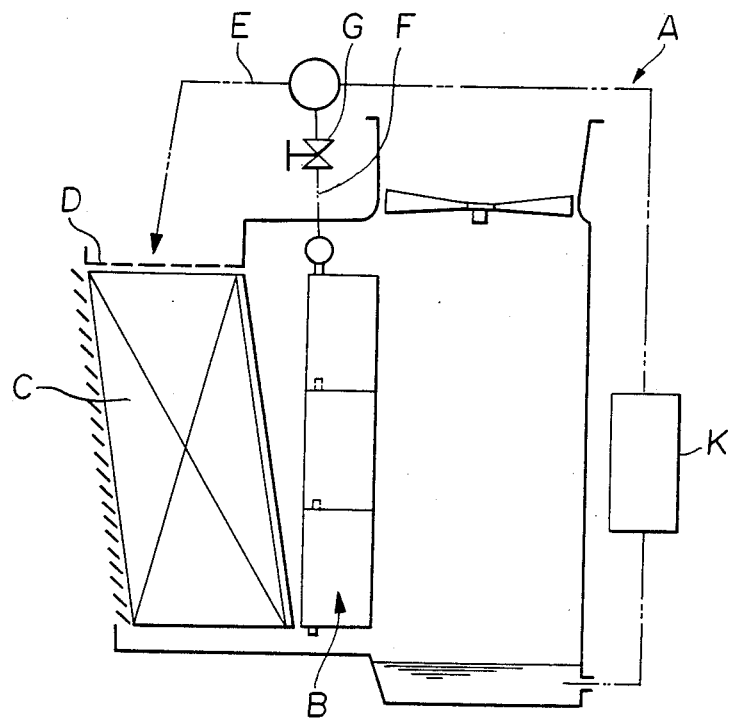
FIG. 6 is a schematic view of a crossflow cooling tower.

The heat exchanger B thus assembled is arrayed inside of a packing material C of the crossflow cooling tower A as shown in FIG. 6. In this case, a feed pipe E for feeding a cooling water to an upper water tank D on the top of packing material C branches halfway, and a branched pipe F is provided with a valve G and intended for a supplying header to the group of heat exchanger units 10.

A blower of the cooling tower A is then driven to rotate, the cooling water or a circulating refrigerant warmed up (30 to 70° C.) by a load K such as air conditioner, refrigerator or the like is fed to a position of the liquid falling speed reducing part 24 from the feed part of each heat exchanger unit through the supplying header F, then the cooling water flows successively in the zigzag passage 23 formed between the deflectors 22 and comes in contact with the wall plates 14, 15 as stirred for the time longer by far than it merely flows vertically, each air flowing passage 33 is thus subjected to a heat exchange with the air flowing horizontally therethrough, and the cooling water itself has the heat removed by the air and so cooled down.

Both walls of the zigzag passage 23 between the deflectors 22 are corrugated with the parallel ridges 80 inclined gradually up to 45 degrees or so toward the downstream side formed almost on overall surfaces of both sides, therefore the cooling water circulating in the zigzag passage 23 is guided upward to rise somewhat whenever it gets over the ridges 80, comes up full to the upstream portion or wets at least an inside wall surface of the horizontal part as high as its upper portion, reaches the bent position 24a and then keeps contact with almost overall surfaces of both the wall plates for a long time.

During operation of the cooling tower, the air remaining in the liquid falling speed reducing part 24 is pushed to an upper corner of the bent passage of the liquid falling speed reducing part 24 according to a move of the cooling water rising somewhat upward by the ridges 80, and is to stay at the portion, however, it flows into the overflowed-liquid escaping conduit 25 through the air vent 60, climbs in the overflowed-liquid escaping conduit 25, and is discharged externally from the supplying port 11.

Then, in case the group of heat exchanger units 10 are placed one upon another in story and so disposed inside of the packing material C, the air having come in contact direct with the cooling water on the packing material C to cool it down and also risen in temperature itself to a high absolute temperature flows all into all the air flowing passages 33 of the heat exchanger unit 10.

On the other hand, the cooling water falling zigzag in the liquid falling speed reducing part 24 of the upper heat exchanger unit 10 flows successively into the liquid falling speed reducing part 24 of the lower heat exchanger unit 10 from the supplying port 11, the flowing cooling water is indirectly cooled by the air passing through the air flowing passage 33, and the air having thus risen itself in temperature is exhausted outside the cooling tower without a whitish smoke or mist from an exhaust port (FIG. 6).

If supply of the cooling water causes a pulsation, supply increases momentarily, or a microbe comes to stick in the liquid falling speed reducing part 24, a sectional area of the liquid falling speed reducing part 24 is narrowed to invite a deterioration of the rate of flow, a level of the liquid reservoir rises to be higher than the dam 26, the cooling water falls partly through the overflowed-liquid escaping conduit 25, and does not come out of the supplying port 11 of the heat exchanger unit 10.

Then, during operation of the cooling tower A, the supplying port 11 of each heat exchanger unit 10 is left open to the air, and the cooling water flows down naturally as zigzagging in the liquid falling speed reducing part 24. Simultaneously with shutdown of the cooling tower, it is subjected to the atmospheric pressure and discharged externally from the discharge port.

Further, the upper end edge 20 of the hollow body 10 is opened in full width and both the wall plates 14, 15 of the upper end edge 20 are overhung outwardly at the even height with the raise 70, the central portion of the upper end edge is formed into the U-shaped recession 20a, the supplying port 11a is formed at a bottom portion of the recession 20a, and in case the recessions 20a of the heat exchanger units 10 abutting each other at the time of assembly come in contact close with each other on an outer peripheral surface of the upper end edge 20, thus forming the longitudinally-extending cooling water reservoir 20b (FIG. 3), the plurality of heat exchanger units 10 are disposed adjacently in parallel, and thus an upper end edge of the heat exchanger B is intended for the cooling water reservoir 20b, the supplying header F is piped horizontally in the reservoir 20b, the cooling water is fed to the reservoir 20b from the supplying header F and is allowed to flow into each heat exchanger unit 10 from the externally-opened supplying port 11a provided on the bottom portion of the recession 20a of each heat exchanger unit 10 which constitutes the reservoir 20b (FIG. 4).

As described, a cooling water is fed to each heat exchanger unit 10, air is flowed horizontally to the air flowing passage 33 between the heat exchanger units 10, and the air and the cooling water are thus subjected to an indirect contact heat exchange.

Then, for using the heat exchanger unit 10 as an enclosed one, a discharging head (not indicated) similar to the supplying header F is connected to the discharge ports 12, however, it goes without saying that the cooling water flowing internally and water applied on the outer surface of each heat exchanger unit 10 will be kept from mixing with each other during use.

Further, the heat exchanger unit 10 with the discharge port 12 formed by opening the lower end edge 21 of the hollow body in full width is disposed on the top of packing material C, and is intended for distributing the cooling water uniformly to the top of packing material C to prevention of whitish smoke or mist (FIG. 5, FIG. 10).

There may be a case where a three-way valve is used as the valve G, thereby adjusting the ratio of a rate of flow of the cooling water to be fed to the packing material to a rate of flow of the cooling water to be fed to the indirect contact type heat exchanger B correspondingly to a cooling temperature. That is, where the cooling temperature is rather high as in wintertime, a rate of flow of the cooling water to be fed to the packing material is minimized, but the cooling temperature is low as in summertime, a rate of flow of the cooling water to be fed to the packing material is increased, thus operating the three-way valve accordingly.

Despite the above-described embodiment, the crossflow cooling tower of the associated invention will remain same even from disposing the aforementioned indirect contact type heat exchanger B on a lower side of the upper water tank D in parallel with the packing material C, and in this case, a branched pipe and a valve are not required, and a piping structure may be simplified accordingly. The above description for function refers to the case where the season is winter or the air temperature is low, therefore when the air temperature is high like summertime, the valve G of the supplying header is closed, and thus supply of the cooling water to the heat exchanger unit 10 is stopped.

Figure 11:
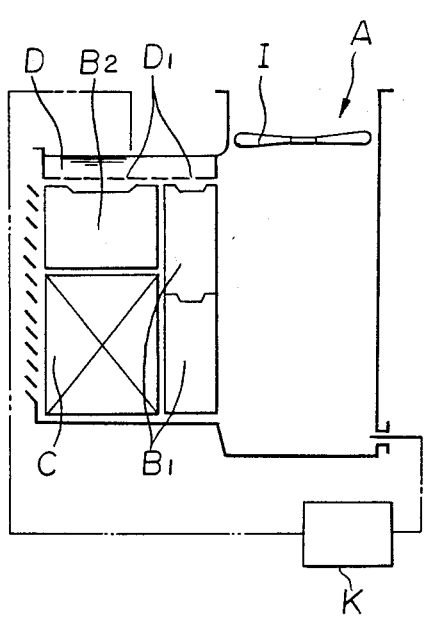
FIG. 11 and FIG. 12 are schematic views showing an example of another crossflow cooling tower each.
Figure 12:
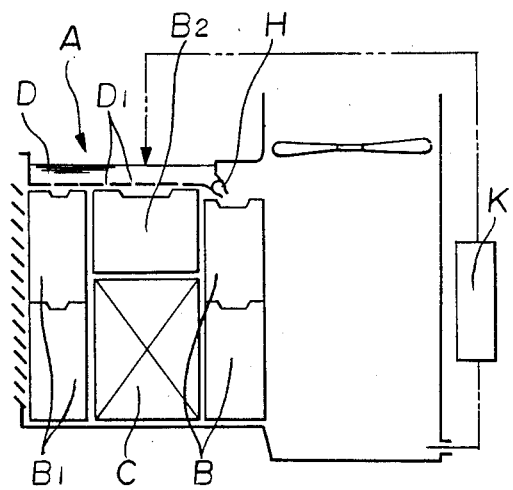

FIG. 11 and FIG. 12 represent another example of the cooling tower according to the invention, each.

In FIG. 11, first indirect contact type heat exchangers $B_1$ are disposed in parallel inside a wet heat exchanger or the packing material C disposed on a lower side of the upper water tank D of the cooling tower A, further a second indirect contact type heat exchanger $B_2$ is disposed in story between the wet heat exchanger C and the upper water tank D, which comes in a value adding heights of the first indirect contact type heat exchangers $B_1$, and a feed part of the first and second indirect contact type heat exchangers $B_1$, $B_2$ opens opposite to shrinkler holes $D_1$. Function and effect of the example are same as those of the aforementioned invention, a dry air high in temperature and low in relative humidity is easy to obtain.

In FIG. 11, the first indirect contact type heat exchangers $B_1$ are disposed outside or inside of the wet heat exchanger or packing material C disposed on a lower side of the upper water tank D of the cooling tower A, the second indirect contact type heat exchanger $B_2$ is disposed in story between the wet heat exchanger C and the upper water tank C, a height of the first indirect contact type heat exchanger $B_1$ comes in a value adding heights of the wet heat exchanger C and the second indirect contact type heat exchanger $B_2$, a nose of a distributing pipe H extending from the upper water tank D is opened to a feed part of the inside indirect contact type heat exchanger $B_1$, while a feed part of the outside indirect contact type heat exchanger $B_1$ is opened opposite to the shrinkler holes $D_1$ on a bottom of the upper water tank D. Function and effect of the example are same as those of the aforementioned invention, and thus the example is suitable for obtaining a dry air high in temperature and low in relative humidity from raising temperature of the air once and then feeding it to the wet heat exchanger and the dry heat exchanger. Then, in the crossflow cooling tower of the invention, it is not particularly required to provide an upper water tank, and a cooling water can be fed smoothly to each liquid flowing passage in a plurality of heat exchanger units constituting the aforementioned heat exchangers from a temporary reservoir formed on an upper end edge of the heat exchangers without increasing the number of parts therefor, and further heat exchanger units for the heat exchanger can easily be replaced.

Next, a further example of the crossflow cooling tower according to the invention will be described with reference to FIG. 13.

In the drawing, a reference numeral 110 denotes a cooling tower shell, a lower water tank 111 is provided on its lower portion, the packing material C with a multiplicity of tongued-and-grooved plates raised thereon is provided on a lower stage within the cooling tower shell 110, a first sprinkler 113 capable of feeding a cooling water to the packing material C is provided right thereon, which has a multiplicity of fine holes perforated in a baseplate of a shallow water tank as illustrated, however, it is not particularly limited to such type. An air intake grille 116 is provided on the cooling tower shell 110 corresponding to one end surface of the packing material C, and in this mode of operation, a portion of the packing material C functions as one kind of direct contact type counterflow or crossflow heat exchanger.

In the invention the indirect contact type heat exchanger B is provided particularly on an upper portion of the first sprinkler 113, and a plane area per single capacity is almost same as that of the packing material C. The heat exchanger B is same as that of working in the aforementioned mode of operation.

Such heat exchangers B are disposed in parallel with a common supply side header 132 at predetermined intervals, and discharge ports of the heat exchangers are opened onto the first sprinkler 113.

A second air intake grille 131 is opened on a side wall of the shell 110 with the heat exchangers B positioned thereon, an air current control plate 135 reciprocating between a duct 134 through which the packing material C and an exhaust port 133 communicate with each other and an air passage outlet of the heat exchanger B is provided inside of the heat exchanger B with its lower end supported on a frame in the cooling tower, which can be fixed at an arbitrary angle from vertical position to horizontal position.

A second sprinkler 136 is provided further over the heat exchanger B, which may be such one as is similar to the first sprinkler 113 in structure.

A supply pipe for supplying a cooling water ranging to the load such as air conditioner, refrigerator and the like is forked through a transfer valve 138, one branched pipe 139 is connected to each heat exchanger unit of the heat exchanger B by way of the supply side header 132, and another branched pipe (second supply pipe) 140 is connected to the second sprinkler 136.

Figure 13:
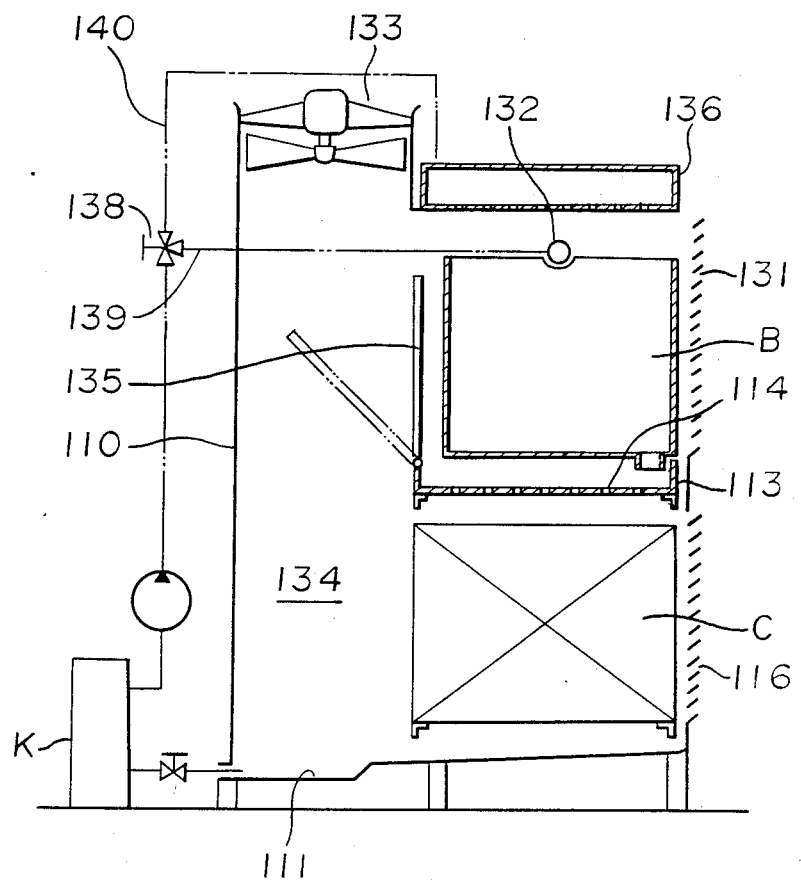
FIG. 13 is a schematic view representing another example of the crossflow cooling tower according to the invention.

In the mode of operation constructed as above, the transfer valve 138 is changed to a side of the one branched pipe 139 so as to allow the cooling water to flow when the air temperature is low, the air current control plate 135 is positioned on a chain line so indicated in FIG. 13 or around with the angle of inclination determined according to the then air temperature and load, and from operating the circuit of the cooling tower, the cooling water passes through each bent liquid flowing passage of the heat exchanger B by way of the supply side header 132, and flows into the first sprinkler 113, and is applied to the lower packing material C, flows into the lower water tank 111, and then returns to the load to recirculation thereafter.

On the other hand, the air comes in through the air intake grilles 116, 131, the cooling water comes in contact direct with the air coming in through the air intake grille 116 at the packing material C, evaporates partly, then the cooling water is cooled on a latent heat of the vaporization, exchanges heat therewith, and the air having risen in temperature climbs from the duct 134.

On the other hand, the air having come in through the second air intake grille 131 passes through the air flowing passage 133 of the heat exchanger B and is subjected to an indirect contact heat exchange with the internal cooling water through the wall plates 14, 15 of each heat exchanger unit, the heated air flows into the duct 134 by way of the air current control plate 135 and is mixed with the wet air in the duct 134, thus decreases relative humidity, raises temperature and is then exhausted from the exhaust port 133. Accordingly, even if cooled down on the air, it is hard to get a whitish smoke or mist.

Next, if the transfer valve 138 is changed to a side of the other branched pipe 140 to operation when the air temperature is high, the cooling water is first fed to the second sprinkler 136, thus sprinkled to an outside of each heat exchanger unit 10 of the heat exchanger B, i.e. to a side of the air flowing passage, wets an outer surface of each heat exchanger unit 10 and flows down into the first sprinkler 113 once, and is then sprinkled over the packing material C as in the case of wintertime and then passes through the load K from the lower water tank 111 to recirculation.

Accordingly, in a portion of the heat exchanger B, the air from the upper air intake port 131 and the cooling water come in contact directly with each other, and thus the cooling water evaporates partly and is cooled down on its latent heat, a cooling effect at the portion of the heat exchanger B may compensate it thoroughly for increase of the load.

Figure 14:
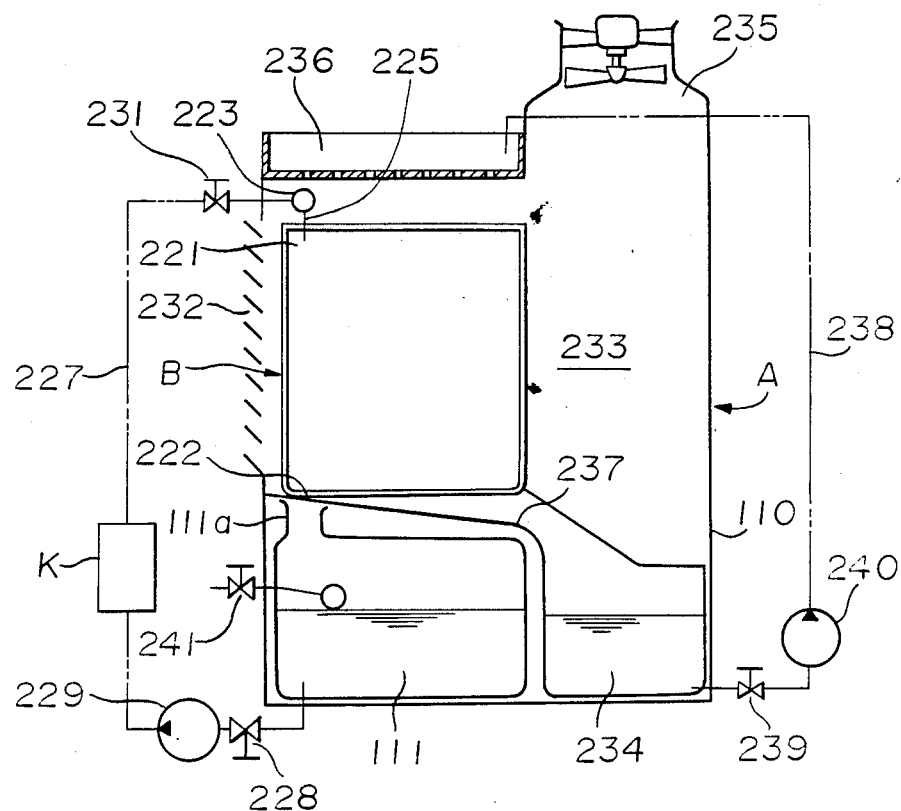
FIG. 14 is a general longitudinal sectional side view of another embodiment of the invention.

FIG. 14 is a diagram showing a case where a typical one in the above described modes of the invention is applied to a closed type cooling tower. In the embodiment as in FIG. 4, since an expansion tank (a reservoir) required for the closed type cooling tower is placed in a casing, the entire system can be simple. In the drawing, like reference characters represent like parts, and hence a further description will be omitted thereof here.

The cooling water storage tank 111 is provided on a lower side of the heat exchanger B, and a capacity of the cooling water storage tank 111 is larger than the capacity of the liquid flowing passage in each heat exchanger unit of the heat exchanger, or preferably 1.5 to 2 times as large as that, and the discharge port of each heat exchanger unit is opened to an upper opening 111a of the cooling water storage tank 111. The discharge port may be coupled to the opening 111a through the common discharge side header. In this case the opening 111a is exposed to the air, thus forming an air passage.

The cooling water storage tank 111 is provided within the shell 110 of the cooling tower A, a cooling water pipe 227 is connected to the load K from a lower portion of the cooling water storage tank 111 through a valve 228 and a pump 229, and is further connected to a header 223 through a valve 231, thus forming a circuit for the cooling water system.

An air intake port 232 is formed on a portion of the shell 110 where the heat exchanger B is provided, a vertical air adit 233 is formed in the shell 110 on a counter side, a drop water tank 234 is provided on a lower end of the air adit 233, and an exhaust port 235 is provided on an upper end of the air adit 233.

A sprinkler 236 is provided on the heat exchanger B, water sprinkled thereby is collected into the drop water tank 234 through an inclined plate 237 provided between the heat exchanger B and the cooling water storage tank 111, which is connected to the sprinkler 236 through a pipe 238, a valve 239 and a ram 240, thereby configuring a sprinkling system circuit.

It is then preferable that an automatic water supply system 241 having a valve operated according a water level be provided on the cooling water storage tank 111.

In such mode of operation, when the system is operated, water in the cooling water storage tank 111 flows into the common header 223 by way of the load K, the cooling water comes into the cooling water passage in each heat exchanger unit of the heat exchanger B through a pipe 225, and while flowing in each bent passage, it is subjected to heat exchange with the air and the sprinkled water through both the wall plates 14, 15, and is then returned to the cooling water storage tank 111 from a discharge port 222 to circulation.

In the invention constructed as described above to function, each heat exchanger unit is air communicating type, and the lower discharge port is connected to the common lower cooling water storage tank, therefore when operation of the cooling tower is stopped, the cooling water in all the heat exchanger units is replaced by the air to flow into the lower storage tank, and hence the cooling water is not capable of freezing within the heat exchanger units. Then, in the unlikely event that a quantity of the cooling water fluctuates, only a quantity of the air brought into the heat exchanger units may fluctuate accordingly, and thus the cooling water passage in the heat exchanger units will never be negative in pressure or collapsed by the atmospheric pressure.

Accordingly, such metal as is thin and small in mechanical strength may be employed for the metallic heat exchanger unit, which is serviceable for light-weight construction to realize.

Figure 15:
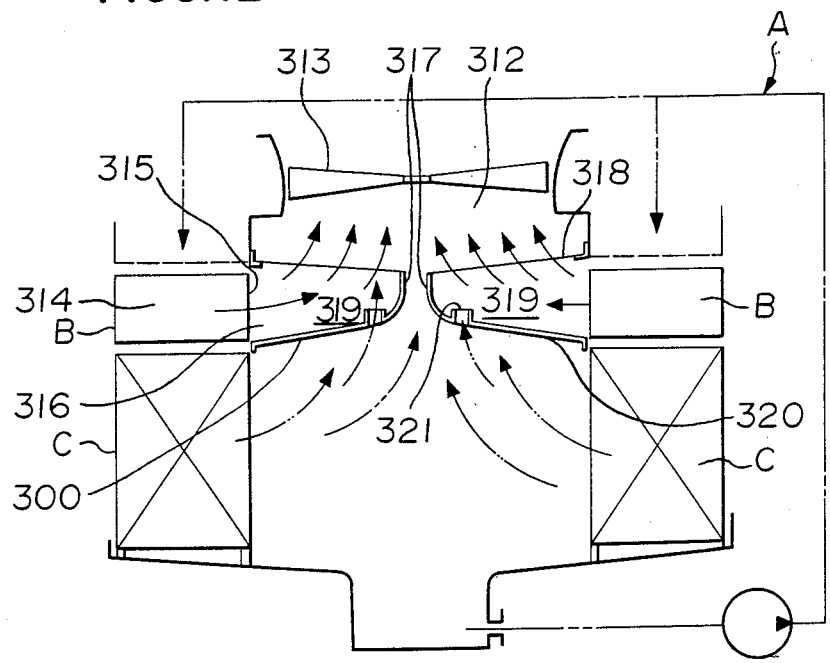
FIG. 15 is a fragmentary schematic view of an example of the cooling tower according to the invention.
Figure 16:
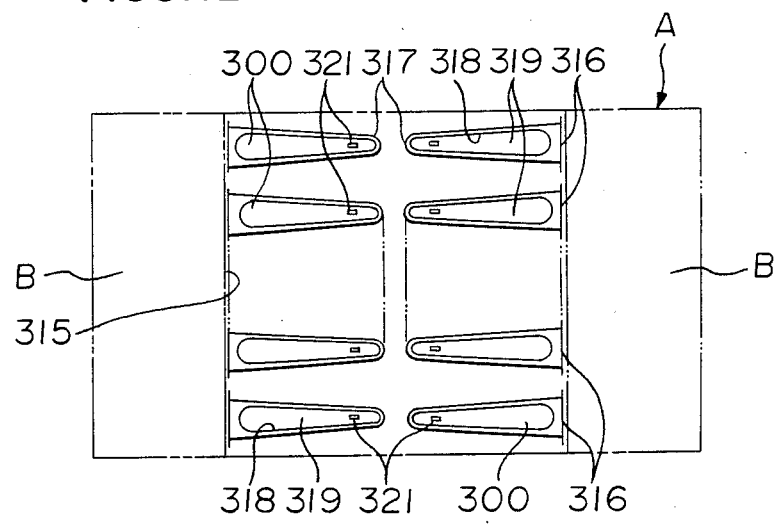
FIG. 16 is a plan view of main part thereof.
Figure 17:
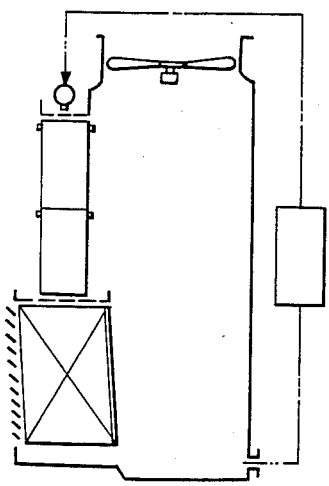
FIG. 17 and FIG. 18 are schematic views of a cooling tower in which a prior art heat exchanger of this kind is incorporated.
Figure 18:
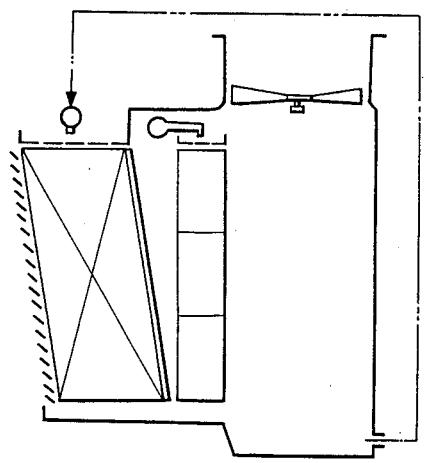

FIG. 15 and FIG. 16 represent one embodiment of a crossflow cooling tower using a heat exchanger with a multiplicity of heat exchanger units shown in FIGS. 3, 4, 5 and 10 disposed in parallel therefor.

In FIG. 15, a reference character A represents a crossflow cooling tower provided with a whitish smoke preventive function, wherein synthetic resin made indirect contact type or dry heat exchanger B is arrayed in story over a plurality of packing materials or wet heat exchangers C, a blower 313 is provided on an exhaust port 312 for exhausting a mixture of the wet air having passed the wet heat exchanger C and the dry air having passed the dry heat exchanger B, which is characterized in that an air intake port 316 facing on an air blow-off port 315 of an air passage 314 of the dry heat exchanger B is provided, a plurality of dry/wet air mixing cylinders 300 are disposed at regular intervals and so overhung horizontally under the exhaust port 312, an air intake height of the cylinder 300 corresponds to a full height of the air blow-off port 315, a nose portion of each cylinder 300 is closed 317, an air discharge port 318 is opened on a peripheral surface of the cylinder 300 ranging from a side of the air blow-off port 315 to a nose side, the cylinder 300 functions as an air release guide chamber 319 internally.

The air discharge port 318 for the cylinder 300 is perforated in an upper wall of the cylinder 300.

There may be a case where the air discharge port 318 for the cylinder 300 is perforated in opposite side walls of the cylinder 300.

Further, there may be a case where a wet air intake port 321 opened into the cylinder 300 is perforated in a bottom portion 320 of the cylinder 300 near to the closed end portion 317.

The upper wall of the cylinder 300 in which the air discharge port 318 for the cylinder 300 is perforated is inclined downward from an upper end of the air blow-off port 315 downwardly of the blower 313 so as to keep away from blades of the blower 313, the bottom portion 320 of the cylinder 300 is inclined upward, counter to the upper wall, from a lower end of the air blow-off port 315 downwardly of the blower 313, thus functioning as a drop receiving part, which is desirable for suction of the dry air and recovery of the drop.

The cylinder 300 is made generally of synthetic resin.

A function of the aforementioned construction according to the particular invention will be described next.

A cooling water fed from refrigerator or the like is sprinkled to fall from upper portion of the synthetic resin made dry heat exchanger, and while falling the cooling water is subjected to an indirect contact heat exchange with the air taken externally into an air passage of the dry heat exchanger and thus cooled down, then it is sprinkled over the wet heat exchanger arrayed in story under the dry heat exchanger, and while falling on the surface of the wet heat exchanger it comes in contact direct with the air, and the cooling water is cooled down to a predetermined temperature on an action of latent heat, collected in a lower water tank of the crossflow cooling tower, circulated to use on the load such as refrigerator or the like, and after temperature rise again, it is refed to the dry heat exchanger.

Meanwhile, the wet air with the absolute humidity raised by heat exchange in the wet heat exchanger passes through the wet heat exchanger on a suction of the blower provided on the exhaust port and then climbs toward the exhaust port.

Then, the dry air with the absolute humidity unchanged by heat exchange in the dry heat exchanger is also subjected to a suction of the blower, and most of the dry air flows into the release guide chamber from the air blow-off port of the air-passage of the dry heat exchanger by way of the air intake port of each cylinder, and some quantity of the dry air is discharged between adjacent cylinders.

Next, the dry air thus dispersed and distributed in the dry air release guide chamber is released toward the exhaust port from the discharge port of each cylinder as keeping the state of almost laminar flow, sucked in the exhaust port uniformly together with the aforementioned some quantity of dry air, and the wet air stream climbs through a vertical passage formed between the adjacent cylinders. The climbing wet air flows along a peripheral surface of the cylinder and is sucked to climb toward the exhaust port as almost laminar flow along with a flow of the dry air released from the air blow-off port. That is, both flows will not be turbulent but arrive at the blower as keeping laminar flows parallel with each other, flows of the dry air and the wet air distributed fine mutually by rotating blades of the blower of small power are agitated and exhausted without mist as a mixture with the absolute humidity adjusted. In other words, the air is exhausted outside the cooling tower without generating whitish smoke.

Where the air discharge port of the cylinder is perforated in an upper wall of the cylinder, a flow of the dry air will never be turbulent and sucked toward the exhaust port.

Where the air discharge port of the cylinder is perforated in opposite side walls of the cylinder, the dry air coming out of the air discharge port is mixed somewhat with the wet air to a cross flow, climbs then along a peripheral surface of the cylinder and is sucked toward the exhaust port.

Further, where the wet air intake port opened into the cylinder near to the closed end portion is perforated in a bottom portion of the cylinder, a part of the wet air is dried in the release guide chamber, the mixture is then released toward the exhaust port and sucked as a laminar flow.

Obviously, numerous modifications and variations of the present invention are possible in light of the above teachings. It is therefore to be understood that within the scope of the appended claims, the invention may be practiced otherwise than as specifically described herein.

What is claimed is:

1. A synthetic resin heat exchanger unit used for a cooling tower, of a flat and thin hollow body formed as a whole by two wall plates wherein the interior functions as a liquid flowing passage, a cooling water feed part open externally is formed on an upper portion of the hollow body, a discharge part open externally is also provided on a lower end of the liquid flowing passage which is a lower edge of the hollow body, a major breadth portion of the liquid flowing passage forms a liquid falling speed reducing part, the liquid falling speed reducing part has horizontally extending deflectors distributed vertically throughout the unit each defining a stage, the deflectors are dislocated every other to form a zigzag passage therebetween;

said heat exchanger unit being characterized in that the liquid falling speed reducing part is disposed to abut on a vertically extending overflowed-liquid escaping conduit through one vertical sealing part at least, an upper end of the vertical sealing part is shaped like a dam, said overflowed-liquid escaping conduit and a reservoir portion on the uppermost stage in the liquid falling speed reducing part communicate with each other through the dam, and an air vent crosses over said vertical sealing part and opens into said overflowed-liquid escaping conduit and is formed at a bent position of said zigzag liquid falling speed reducing part, and a raise is formed as a spacer on outer surfaces of both said wall plates.

2. The synthetic resin heat exchanger unit used for a cooling tower according to claim 1, wherein said hollow body is a vacuum or blow molding.

3. The synthetic resin heat exchanger unit used for a cooling tower according to claim 1, wherein said overflowed-liquid escaping conduit is provided along one side edge of said hollow body.

4. The synthetic resin heat exchanger unit used for a cooling tower according to claim 1, wherein said overflowed-liquid escaping conduit is provided along both side edges of said hollow body.

5. The synthetic resin heat exchanger unit used for a cooling tower according to claim 1, wherein said liquid falling speed reducing part is separated into at least two sequences of liquid flowing passages at the central portion by a vertical partition sealing portion.

6. The synthetic resin heat exchanger unit used for a cooling tower according to claim 1, wherein parallel ridges inclined gradually up to approximately 45 degrees toward a downstream direction are formed on surfaces inside of both wall plates constituting said liquid falling speed reducing part.

7. The synthetic resin heat exchanger unit used for a cooling tower according to claim 1, wherein a cylindrical discharge port is provided on a lower edge corner of said hollow body as said discharge port.

8. The synthetic resin heat exchanger unit used for a cooling tower according to claim 1, wherein said discharge port is formed by opening a lower edge of said hollow body in full width.

9. The synthetic resin heat exchanger unit used for a cooling tower according to claim 1, wherein an upper edge of said hollow body is opened in full width and both wall plates of the upper edge are overhung outwardly at the height even with said raise, a central portion of the upper edge is formed in a U-shaped recession, and said feed part is formed of a bottom portion of the recession.

10. In a crossflow cooling tower incorporating within a frame an indirect contact type heat exchanger which comprises a plurality of synthetic resin heat exchanger units of a flat and thin hollow body formed as a whole by two wall plates which are arranged in parallel with each other wherein the interior functions as a liquid flowing passage, a cooling water feed part open externally is formed on an upper portion of the hollow body, a discharge part open externally is also provided on a lower end of the liquid flowing passage which is a lower edge of the hollow body, a major breadth portion of the liquid flowing passage forms a liquid falling speed reducing part, the liquid falling speed reducing part has horizontally extending deflectors distributed vertically throughout the unit each defining a stage, a zigzag passage being formed between the deflectors, and using a raise formed on front and pack of these heat exchanger units as a spacer, forming a horizontal air flowing passage between the adjacent heat exchanger units;

the improvement characterized in that the liquid speed reducing part is disposed to abut on a vertically extending overflowed-liquid escaping conduit through one vertical sealing part at least, an upper end of the vertical sealing part is shaped like a dam, said overflowed-liquid escaping conduit and reservoir portion on the uppermost stage in the liquid falling speed reducing part communicate with each other through the dam and an air vent crosses over said vertical sealing part and opens into said overflowed-liquid escaping conduit and is formed at a bent portion of said zigzag liquid falling speed reducing part, an upper edge of the hollow body is opened in full width and both wall plates of the upper edge are overhung outwardly, a central portion of the upper edge is formed into a U-shaped recession, said cooling water feed part is formed of a bottom of the recession, said cooling water feed parts come in contact close with each other to form a temporary cooling water storage part along an upper edge of said indirect contact type heat exchanger at the time when said heat exchanger units are arrayed adjacently in sequence.

11. The crossflow cooling tower according to claim 10, wherein fist said indirect contact type heat exchangers are disposed in parallel on the inside of a wet heat exchanger disposed on a lower side of an upper water tank of said cooling tower, further a second said indirect contact type heat exchanger is disposed vertically between the wet heat exchanger and the upper water tank, the combined height of first said indirect contact type heat exchangers equaling the heights of said wet heat exchanger and second indirect contact type heat exchanger together, a feed part for said first and second indirect contact type heat exchangers is open to face a sprinkling hole in a bottom of the upper water tank.

12. The crossflow cooling tower according to claim 10, wherein first said indirect contact type heat exchangers are disposed in parallel on the inside and outside of a wet heat exchanger disposed on a lower side of an upper water tank of said cooling tower, further a second said indirect contact type heat exchanger is disposed vertically between the wet exchanger and the upper water tank, the combined height of first said indirect contract type heat exchangers equaling the heights of said wet heat exchanger and second said indirect contact type heat exchanger together, a nose of a distributing pipe extending from the upper water tank is open to a feed part of the inside indirect contact type heat exchanger, a feed part of the outside indirect contact type heat exchanger is open to face a sprinkling hole in a bottom of the upper water tank.

13. The crossflow cooling tower according to claim 10, wherein said indirect contact type heat exchanger is provided above a wet heat exchanger with a first sprinkler interposed therebetween, a second sprinkler for applying water to an air contact surface of said indirect contact type heat exchanger is provided on an upper portion of said indirect contact type heat exchanger, a second supply pipe branched from said supply pipe through a transfer valve is connected to said second sprinkler.

14. The crossflow cooling tower according to claim 10, wherein each heat exchanger unit having a liquid flowing passage formed therein has at least a draft part opened to the air at each upper supplying part, each lower discharge part is connected to a common air-communicating lower cooling water storage tank.

15. The cross flow cooling tower according to claim 10, which comprises an air intake port facing on an air blow-off port of the air passage of said indirect contact type heat exchanger, having disposed therein a plurality of dry/wet air mixing cylinders projectingly and being horizontally downward of an exhaust port, an air intake height of the cylinders coinciding with an overall height of the air blow-off port, wherein:

a nose portion of each cylinder is closed, an air discharge port is opened on a peripheral surface of the cylinder from an air blow-off port side toward a nose side, said cylinders each function as a dry air release guide chamber internally.

16. The crossflow cooling tower according to claim 15, wherein the air discharge port of said cylinder is perforated in an upper wall of the cylinder.

17. The crossflow cooling tower according to claim 15, wherein a wet air intake port open into the cylinder is perforated in a bottom portion of said cylinder.

18. The crossflow cooling tower according to claim 15, wherein said cylinder is made of synthetic resin.

19. The crossflow cooling tower according to claim 15, wherein the air discharge port of said cylinder is perforated in opposite side walls of the cylinder.

20. The crossflow cooling tower according to claim 15, wherein an upper wall of the cylinder in which the air discharge port for said cylinder is perforated is inclined to extend downward from an upper end of the air blow-off port of the dry heat exchanger downward of said blower so as to keep away from blades of the blower, a bottom of the cylinder is inclined upward, counter to the upper wall, from a lower end of the air blow-off port downward of said blower, thus functioning as a drop receiving part.

* * * * *